(12) United States Patent
Ellin et al.

(10) Patent No.: US 8,674,258 B2
(45) Date of Patent: Mar. 18, 2014

(54) METHOD AND APPARATUS FOR SCALE MANUFACTURE WITHOUT SUBSTANTIAL REMOVAL OF MATERIAL

(75) Inventors: Alexander David Scott Ellin, Horsley (GB); James Reynolds Henshaw, Stroud (GB)

(73) Assignee: Renishaw PLC, Wotton-under-Edge (GB)

( * ) Notice: Subject to any disclaimer, the term of this patent is extended or adjusted under 35 U.S.C. 154(b) by 725 days.

(21) Appl. No.: 11/918,986

(22) PCT Filed: May 10, 2006

(86) PCT No.: PCT/GB2006/001714
§ 371 (c)(1),
(2), (4) Date: Oct. 22, 2007

(87) PCT Pub. No.: WO2006/120440
PCT Pub. Date: Nov. 16, 2006

(65) Prior Publication Data
US 2009/0026184 A1    Jan. 29, 2009

(30) Foreign Application Priority Data
May 13, 2005    (GB) .................................. 0509727.4

(51) Int. Cl.
*B23K 26/36*    (2006.01)
*B23K 31/00*    (2006.01)

(52) U.S. Cl.
USPC .................................................. 219/121.69

(58) Field of Classification Search
USPC ............. 219/121.65, 121.66, 121.68, 121.69; 33/707
See application file for complete search history.

(56) References Cited

U.S. PATENT DOCUMENTS

| | | | |
|---|---|---|---|
| 4,270,130 A * | 5/1981 | Houle et al. | 346/77 E |
| 4,677,293 A | 6/1987 | Michel | |
| 4,732,410 A * | 3/1988 | Holbein et al. | 283/67 |
| 4,771,010 A * | 9/1988 | Epler et al. | 438/36 |
| 4,932,131 A * | 6/1990 | McMurtry et al. | 33/1 M |
| 4,972,061 A * | 11/1990 | Duley et al. | 219/121.66 |
| 5,101,260 A * | 3/1992 | Nath et al. | 257/53 |
| 5,143,894 A * | 9/1992 | Rothschild et al. | 505/220 |
| 5,450,199 A | 9/1995 | Rieder | |

(Continued)

FOREIGN PATENT DOCUMENTS

| DE | 196 08 937 A1 | 9/1996 |
|---|---|---|
| DE | 19608937 * | 9/1996 |

(Continued)

OTHER PUBLICATIONS

Mai et al., Abstract of "Micromelting and its effects on surface topography and properties in laser polishing of stainless steel," *Journal of Laser Applications*, vol. 16, Issue 4, pp. 221-228, Nov. 2004.

(Continued)

*Primary Examiner* — Samuel M Heinrich
(74) *Attorney, Agent, or Firm* — Oliff PLC

(57) ABSTRACT

A method of making metrological scale for scale reading apparatus includes directing a laser beam onto a scale substrate (12). The laser parameters are such that the local area of the scale substrate (12) on which the laser beam is incident is caused to be displaced, thus creating scale markings (16, 20, 22).

28 Claims, 3 Drawing Sheets

(56) References Cited

U.S. PATENT DOCUMENTS

Figure 1:
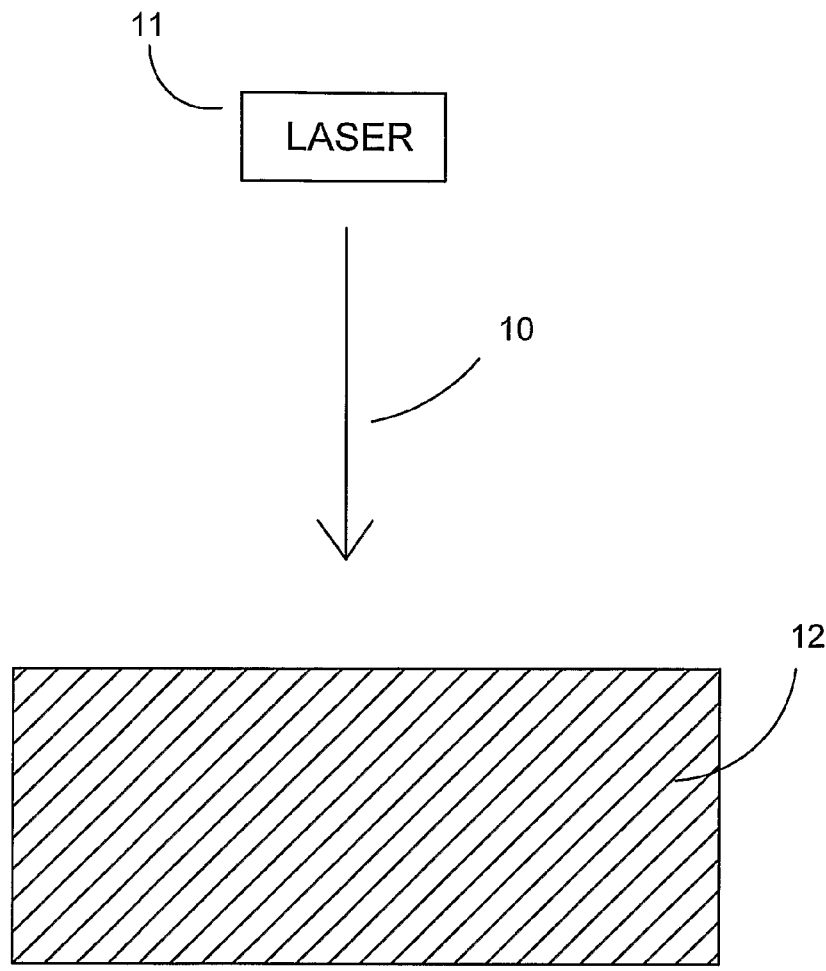

| | | | |
|---|---|---|---|
| 5,635,089 A | 6/1997 | Singh et al. | |
| 5,712,191 A * | 1/1998 | Nakajima et al. | 438/487 |
| 5,880,882 A | 3/1999 | Michel et al. | |
| 5,907,144 A * | 5/1999 | Poon et al. | 235/462.08 |
| 5,948,288 A * | 9/1999 | Treves et al. | 219/121.68 |
| 5,979,238 A | 11/1999 | Boege et al. | |
| 6,105,501 A * | 8/2000 | Phillips et al. | 101/457 |
| 6,160,568 A * | 12/2000 | Brodsky et al. | 347/247 |
| 6,220,058 B1 * | 4/2001 | Koyama et al. | 65/392 |
| 6,229,140 B1 | 5/2001 | Ishizuka | |
| 6,262,802 B1 | 7/2001 | Kiyono | |
| 6,285,002 B1 * | 9/2001 | Ngoi et al. | 219/121.73 |
| 6,392,683 B1 * | 5/2002 | Hayashi | 347/224 |
| 6,399,009 B1 | 6/2002 | Sato et al. | |
| 6,518,540 B1 * | 2/2003 | Wee et al. | 219/121.61 |
| 6,709,720 B2 * | 3/2004 | Hayakawa et al. | 427/555 |
| 6,906,315 B2 | 6/2005 | Tobiason | |
| 7,214,573 B2 * | 5/2007 | Yamazaki et al. | 438/164 |
| 2002/0021450 A1 | 2/2002 | Aoki | |
| 2002/0076129 A1 | 6/2002 | Holzapfel et al. | |
| 2003/0048536 A1 | 3/2003 | Aoki | |
| 2004/0011772 A1 * | 1/2004 | Okumura | 219/121.69 |
| 2004/0011948 A1 | 1/2004 | Tobiason | |
| 2004/0124184 A1 * | 7/2004 | An et al. | 219/121.66 |
| 2004/0137663 A1 * | 7/2004 | Amer et al. | 438/118 |
| 2005/0083575 A1 * | 4/2005 | Karam, II | 359/572 |
| 2005/0211680 A1 * | 9/2005 | Li et al. | 219/121.68 |
| 2007/0240325 A1 | 10/2007 | Pelsue et al. | |
| 2008/0011852 A1 * | 1/2008 | Gu et al. | 235/454 |

FOREIGN PATENT DOCUMENTS

| | | | |
|---|---|---|---|
| EP | 0500110 A1 * | 8/1992 | |
| EP | 0 626 228 A1 | 11/1994 | |
| EP | 1 887 324 A1 | 2/2008 | |
| FR | 2 752 296 A1 | 2/1998 | |
| JP | A-04-033784 | 2/1992 | |
| JP | A 04-178289 | 6/1992 | |
| JP | 05169286 A * | 7/1993 | |
| JP | 06269964 A * | 9/1994 | |
| JP | A 06-269964 | 9/1994 | |
| JP | 411095196 A * | 4/1999 | |
| JP | A-2003-172639 | 6/2003 | |
| WO | WO 88/00332 A1 | 1/1988 | |
| WO | WO 03/041905 A1 | 5/2003 | |
| WO | WO 03/061891 A2 | 7/2003 | |
| WO | WO 03/061891 A3 * | 7/2003 | |
| WO | WO 2007/044798 A2 | 4/2007 | |
| WO | WO 2009/130449 A1 | 10/2009 | |

OTHER PUBLICATIONS

Merino et al., "A new way of manufacturing high resolution optical encoders by nanoimprint lithography," *MNE Conference on Micro and Nano Engineering*, Sep. 17-20, 2006, Barcelona, Spain, http://www.samlab.unine.ch/ConferenceCD/MNE2006/Session%204B/4B-1.pdf.

Office Action dated Sep. 25, 2012 issued in Japanese Patent Application No. 2008-510640 (with translation).

* cited by examiner

METHOD AND APPARATUS FOR SCALE MANUFACTURE WITHOUT SUBSTANTIAL REMOVAL OF MATERIAL

The present invention relates to a method and apparatus for manufacture of metrological scale for scale reading apparatus. In particular, the invention relates to a method and apparatus of making metrological phase scale using a laser.

A known form of scale reading apparatus for measuring relative displacement of two members comprises a scale on one of the members having scale marks defining a pattern and a readhead provided on the other member. An optical scale reading apparatus has means for illuminating the scale and detecting means in the readhead responsive to a resultant light pattern to produce a measure of relative displacement of the scale and readhead. A scale having its marks in a periodic pattern is known as an incremental scale and provides an output of up and down counts. A scale may be provided with reference marks, which when detected by the readhead enable the exact position of the readhead to be determined. The scale may have absolute code marks which enable the absolute position of the readhead to be determined anywhere on the scale.

Scale and readhead systems are not limited to optical systems. Magnetic, capacitance and inductive reading systems are also known.

Metrological scales may for example be linear, rotary or two-dimensional. Rotary scales may have the scale markings provided radially on a face or axially on the circumference of a rotary part.

A scale may be an amplitude scale or a phase scale. In the amplitude scale the scale pattern is made from two different types of sections. A first type of section reflects incident light to the readhead and the second type of section does not. For example an incremental amplitude scale may comprise alternate reflecting and non-reflecting lines, such as a chrome on glass scale.

A phase scale has a form that reflects light from the different sections at different phases when detected at the readhead.

International Patent Application No. WO03/041905 discloses a method of making a metrological scale in which a laser is used to produce scale markings on a scale substrate by laser ablation. Material at the location of the scale marking is thus removed by boiling, vaporisation or ejection of solid particles. This method creates non-reflective scale markings on the scale substrate. This is suitable for an amplitude scale but not suitable for a phase scale.

The present invention provides a method of making metrological scale for scale reading apparatus, the method comprising the steps of:
 providing a scale substrate;
 directing a laser beam onto the scale substrate;
 wherein the laser parameters are such that the local area of the scale substrate on which the laser beam is incident is caused to be displaced, thus creating scale markings.

The displacement of substrate material includes the initial step of causing the substrate to soften and then displacing it using laser energy.

Preferably the local area of the scale substrate is caused to be displaced without substantial removal of material.

Preferably the laser beam is pulsed.

The laser parameters may include one or both of wavelength and pulse duration. The optimum wavelength depends on the reflectivity of the scale substrate, whilst the pulse duration effects the peak laser power applied to the scale substrate.

The scale substrate may be a metallic material, such as a pure metal or alloy. It may comprise a uniform metallic material or may comprise a metallic coating on another material, such as glass.

The scale substrate may be a non-metallic material for example glass, or a polymer, such as thermoplastic material. It may comprise a uniform non-metallic material or a non-metallic coating on another material.

The scale may comprise a phase scale in which the scale comprises different segments having different parameters.

The action of the laser on the scale substrate does not substantially alter the optical properties of the substrate; each point on the scale remains reflective. Instead the scale markings are provided by sections of different height on the scale substrate.

The method may comprise an additional step in which a reflective coating is applied to the scale.

The method may comprise an additional step in which the scale is cleaned once the scale markings have been produced.

Figure 2:
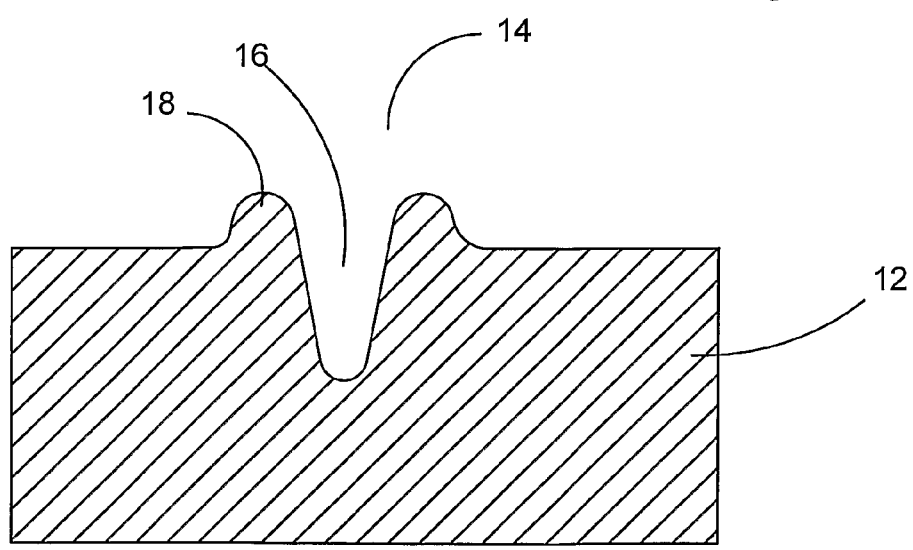
Figure 3:
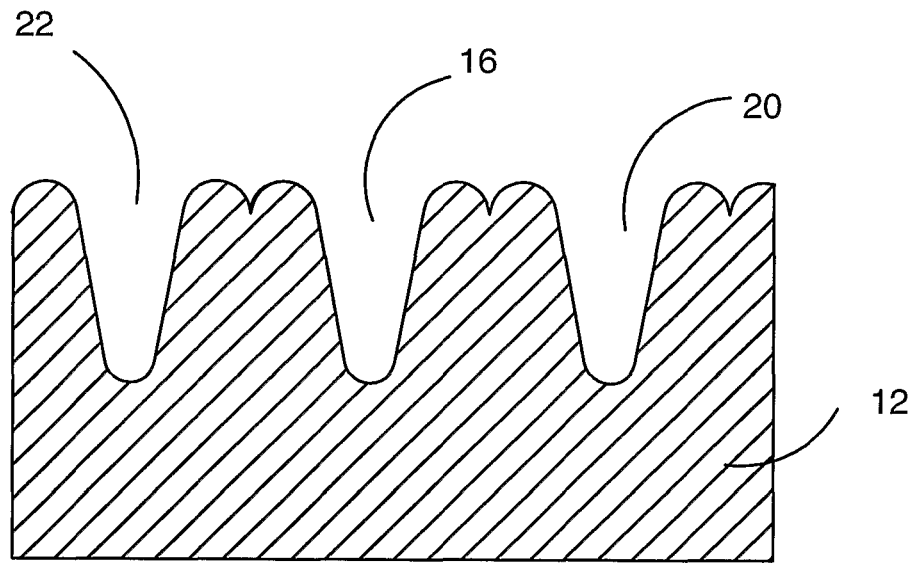
Figure 4:
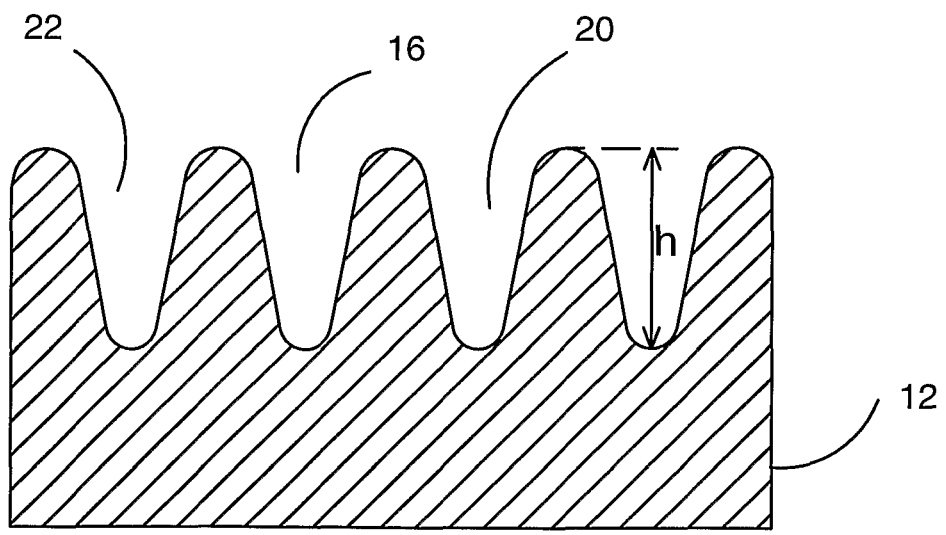
Figure 5:
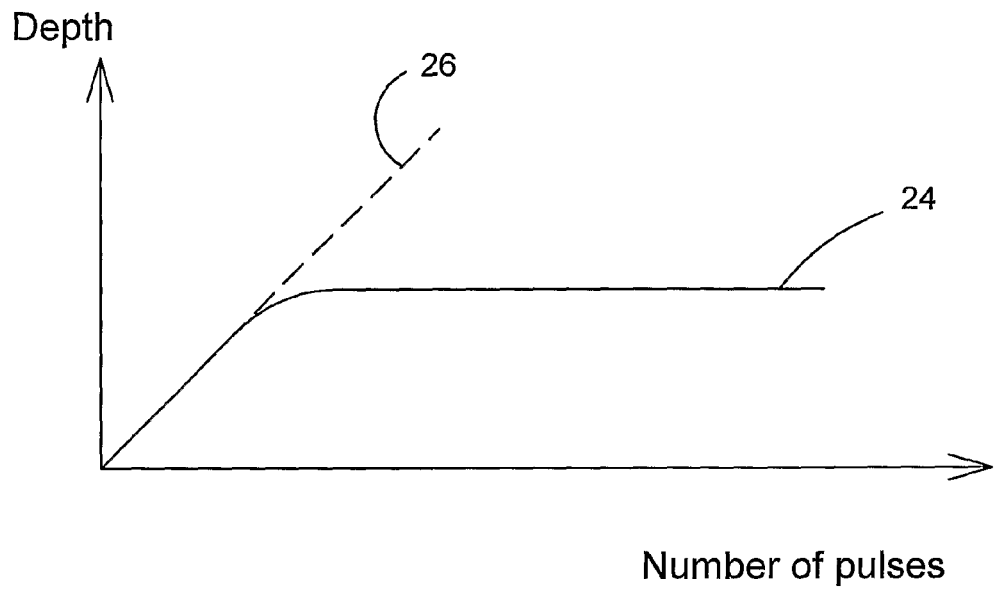
Figure 6:
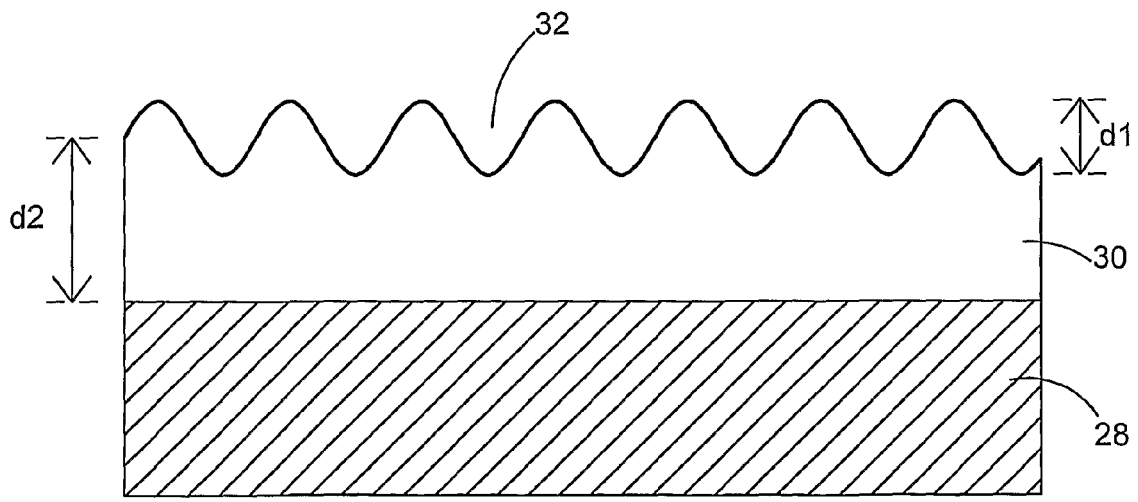

Preferred embodiments of the invention will now be described by way of example with reference to the accompanying drawings wherein:

FIG. 1 illustrates a laser beam incident on a scale substrate;
FIG. 2 illustrates a single scale marking on a scale substrate;
FIG. 3 illustrates multiple scale markings on a scale substrate;
FIG. 4 illustrates multiple scale markings on a scale substrate placed sufficiently close together to form a sinusoidal profile;
FIG. 5 is a graph of depth of scale marking against number of laser pulses; and
FIG. 6 illustrates scale markings formed on a metallic coating on a glass substrate.

A first embodiment of the invention will now be described with reference to FIGS. 1 and 2. A beam 10 from a laser 11, such as a Nd:YAG laser, is focussed onto a metallic substrate 12, such as stainless steel or Invar. The metallic substrate may comprise a pure metal or an alloy. The main factors in choice of material are that it is preferably reflective and that it is suitable as a scale substrate. The laser parameters are chosen so that the metallic material at the focal point of the laser is substantially melted and displaced. This forms a profile 14 as illustrated in FIG. 2.

As can be seen from FIG. 2, the laser beam causes metallic material to be moved away from the laser focus creating a trough 16 and surrounding crests 18.

The laser beam is used to create adjacent markings 16,20, 22 as shown in FIG. 3. A scale with such a profile would exhibit strong sub-harmonics. If, however, the lines are placed sufficiently close together that the adjacent crests merge, as illustrated in FIG. 4, these sub-harmonics can be minimised.

Displacement of material by the laser enables superposition of features to create a form giving appropriate scale properties. For example, the total height h of the scale marking from the trough to the peak of the crest is chosen so that it is appropriate to the wavelength of the light source used in the readhead.

FIG. 5 illustrates the relationship between the depth of the trough and the number of continuous pulses of the laser. As the number of continuous pulses is increased, the depth of the trough will increase up to a limit, as shown by the horizontal part of line 24. After this limit has been reached, an increase in the number of continuous pulses will not cause any increase in the depth of the trough. A possible reason for this is that as the number of continuous pulses increases beyond a certain limit, a molten pool of material is created in the trough, which flows back into the trough when it is displaced.

The depth of the troughs can be increased beyond this limit by using pulse bursts with a pause in between so that the molten material in the trough can solidify between bursts. The dashed line 26 in FIG. 5 illustrates the relationship between depth and number of pulses when there is a pause between pulse bursts. This method gives better control in the creation of scale markings.

This method of creating scale markings is suitable for a continuous process. A first pulse or set of pulses is used to create a shallow scale marking as the scale substrate and laser are moved relative to each other, thus forming a series of scale markings. This is then repeated, with subsequent pulses being used to deepen the scale markings until the desired depth is achieved. Thus for example, a first laser pulse may be applied to each line on a section of scale, then a second laser pulse is applied to each of these lines, etc.

During the scale manufacture process, as the scale substrate material melts under the action of the laser pulse, some splashing may occur, leaving globules on the surface. The surface finish of the scale may be improved by cleaning it and thereby removing these globules of extraneous material. Ultrasound cleaning is a suitable method for removing this extraneous material.

Although the above description describes the creation of scale markings on a metallic substrate, this method is also suitable for creating scale markings on other substrates.

FIG. 6 illustrates a scale substrate which comprises a glass plate 28 with a chrome coating 30. The scale markings 32 may be created on the chrome coating 30 as previously described. It is important that the depth d2 of the chrome layer 30 is substantially thicker than the depth d1 of laser penetration so that the metal/glass bond is not broken by the laser, with the risk that the chrome layer is blown off the glass. For example the chrome depth d2 may be about 6-10 µm whilst the depth d1 of the scale markings is in the range of about 0.2 µm.

Other metallic materials may be used in place of chrome. Also the glass substrate may be replaced by another material.

Non-metallic materials may be used as the scale substrate for example glass or a polymer. For example, a suitable scale material is a polymer coating on a substrate. As with the metal on glass embodiment, the scale profile is created in the polymer, for example a thermoplastic. As polymers are not reflective, an additional step will be required of coating the polymer with a reflective material (for example a metallic material). This step is required for other non-reflective scale substrates. The advantage of using a polymer instead of a metal is that a lower powered laser may be used to create the scale markings.

The laser energy is chosen to match the polymer and create the desired melt and flow at the surface.

Another suitable scale material is a thick non metallic substrate, for example, this could comprise a polymer as previously described.

The laser must be chosen to match the scale substrate. The laser power must be sufficient to melt a local area of the scale substrate but not too powerful so that it the material undergoes boiling or sublimation.

The required wavelength of the laser depends on the reflectivity of the material of the scale substrate. In addition, as the wavelength affects the focus of the laser, the wavelength is chosen so that it is sufficiently short to create small features on the scale substrate.

The laser may be focussed onto the scale substrate using, for example, a lens. The lens may be chosen so that the laser is focused into a straight line, thus producing the scale line. For example, a cylindrical lens could be used.

Alternatively, mask projection may be used to create the scale features. A laser, such as an excimer laser, may be used which produces a flat homogenous light beam and which has a short wavelength in the deep UV sufficient to create small features.

The above examples describe the mechanism for displacement of material to include the initial step of melting the material. The substrate may alternatively be caused to soften and then displaced by the laser energy. The mechanism could comprise heating and plastic flow induced by thermal or gas expansion shock.

Although the above embodiments describe a linear scale, this method of scale production is also suitable for rotary and two dimensional scales.

Features such as reference marks may be provided in the scale, these may be phase scale reference marks or alternatively regions of non-reflective scale.

The invention claimed is:

1. A method of making metrological phase scale for phase scale reading apparatus, the method comprising the steps of:
   providing a scale substrate;
   directing a laser beam onto the scale substrate;
   wherein laser parameters are such that a local area of the scale substrate on which the laser beam is incident is caused to be displaced, thus creating phase scale markings.

2. A method according to claim 1 wherein the laser beam is pulsed.

3. A method according to claim 1 wherein the local area of the scale substrate is caused to be displaced without substantial removal of material.

4. A method according to claim 1 wherein the laser parameters are such that the local area of the scale substrate, on which the laser beam is directed, is caused to melt.

5. A method according to claim 1 wherein the displacement of substrate material includes an initial step of causing the substrate to soften and then displacing it using laser energy.

6. A method according to claim 1, wherein the scale markings created by the displacement of the scale substrate include alternating troughs and crests.

7. A method according to claim 6, wherein a depth of the troughs is increased by using a number of pulses of laser light, an interval between the pulses being controlled to affect the depth.

8. A method according to claim 6 wherein the scale markings are sufficiently close together such that adjacent crests merge.

9. A method according to claim 1 wherein the laser parameters include at least one of wavelength or pulse duration.

10. A method according to claim 1, wherein laser power is sufficient to melt the local area of the scale substrate but not too powerful so that it causes substrate material to undergo boiling or sublimation.

11. A method according to claim 1 wherein the laser beam is focussed onto the scale substrate.

12. A method according to claim 11, wherein the laser beam is focussed onto the scale substrate using a lens.

13. A method according to claim 12 wherein the lens is such that light from the laser beam is focussed into a straight line.

14. A method according to claim 1 wherein a mask projection is used to create scale features.

15. A method according to claim 14 wherein a laser generating the laser beam is an excimer laser.

16. A method according to claim 1, wherein the scale substrate is a metallic material.

17. A method according to claim 16 wherein the scale substrate includes a uniform metallic material.

18. A method according to claim 16, wherein the scale substrate is a metallic coating on a non-metallic material.

19. A method according to claim 1, wherein the scale substrate is a non-metallic material.

20. A method according to claim 19 wherein the scale substrate includes a uniform non-metallic material.

21. A method according to claim 19 wherein the scale substrate includes a non-metallic coating on another material.

22. A method according to claim 19 wherein the scale substrate includes a polymer or glass.

23. A method according to claim 1, wherein the scale includes a phase scale in which the scale has different segments having different parameters.

24. A method according to claim 1, wherein the method comprises an additional step in which a reflective coating is applied to the scale.

25. A method according to claim 1, wherein the method comprises an additional step in which the scale is cleaned once the scale markings have been produced.

26. A method according to claim 6, wherein a height from the troughs to peaks of the crests is chosen according to a wavelength of light used in the phase scale reading apparatus.

27. A method according to claim 24, wherein a depth of the reflective coating is greater than a depth of the scale markings.

28. A method according to claim 27, wherein the depth of the reflective coating is in a range of about 6 micrometers to 10 micrometers, and the depth of the scale markings is about 0.2 micrometers.

* * * * *